United States Patent [19]

Sancier

[11] Patent Number: 4,529,576
[45] Date of Patent: Jul. 16, 1985

[54] PROCESS AND APPARATUS FOR OBTAINING SILICON FROM FLUOSILICIC ACID

[75] Inventor: Kenneth M. Sancier, Menlo Park, Calif.

[73] Assignee: SRI International, Menlo Park, Calif.

[21] Appl. No.: 453,457

[22] Filed: Dec. 27, 1982

[51] Int. Cl.³ .............................................. C01B 33/02
[52] U.S. Cl. .................................... 423/350; 423/349; 75/84.4; 422/158; 422/187
[58] Field of Search ........................... 423/348–350; 422/158, 186, 187, 202, 199, 275, 276; 261/76; 266/227; 75/84.4, 84.5

[56] References Cited

U.S. PATENT DOCUMENTS

| | | | |
|---|---|---|---|
| 524,173 | 8/1894 | Jacques | 423/350 |
| 1,518,872 | 12/1924 | Pacz | 423/350 |
| 2,172,969 | 9/1939 | Eringer | 423/350 |
| 2,840,588 | 6/1958 | Pease | 423/341 |
| 2,890,953 | 6/1959 | Hill et al. | 75/84.5 |
| 2,941,867 | 6/1960 | Maurer | 423/298 |
| 3,085,872 | 4/1963 | Griffiths | 75/84.1 R |
| 3,743,606 | 7/1973 | Marion et al. | 422/202 |
| 4,070,444 | 1/1978 | Ingle | 423/349 |
| 4,102,764 | 7/1978 | Harvey, II | 423/350 |
| 4,102,765 | 7/1978 | Fey et al. | 423/350 |
| 4,102,766 | 7/1978 | Fey | 423/350 |
| 4,102,767 | 7/1978 | Mazelsky et al. | 423/350 |
| 4,102,985 | 7/1978 | Harvey, II | 423/350 |
| 4,138,509 | 2/1979 | Ingle et al. | 423/341 |
| 4,139,438 | 2/1979 | Fey et al. | 423/350 |
| 4,169,129 | 9/1979 | Keeton | 423/350 |
| 4,188,368 | 2/1980 | Wolf et al. | 423/350 |

OTHER PUBLICATIONS

"Leading Edge" Summer 1979, pp. 22–23.
DOE/JPL 954471–Quarterly Reports 1–15, and Final Report, (1976–1980).
NASA Tech. Briefs, vol. 7, No. 2, Jul. 1983, pp. 162–163.
DOE/JPL 954471, Final Report, Mar. 31, 1980.
ERDA/JPL 954471, Report No. 2-3, 1976.

Primary Examiner—William R. Dixon, Jr.
Assistant Examiner—Steven Capella

[57] ABSTRACT

Process for producing low cost, high purity solar grade Si wherein a reduction reaction, preferably the reduction of $SiF_4$, by an alkali metal (liquid Na preferred) is carried out essentialy continuously by injecting of reactants in substantially stoichiometric proportions into a reaction chamber having a controlled temperature thereby to form a mist or dispersion of reactants. The reactants being supplied at such a rate and temperature that the reaction takes place far enough away from the entry region to avoid plugging of reactants at the entry region, the reaction is completed and whereby essentially all reaction product solidifies and forms a free flowing powder before reaction product hits a reaction chamber wall. Thus, the reaction product does not adhere to the reaction chamber wall or pick up impurities therefrom. Separation of reaction products is easily carried out by either a leach or melt separation process.

8 Claims, 6 Drawing Figures

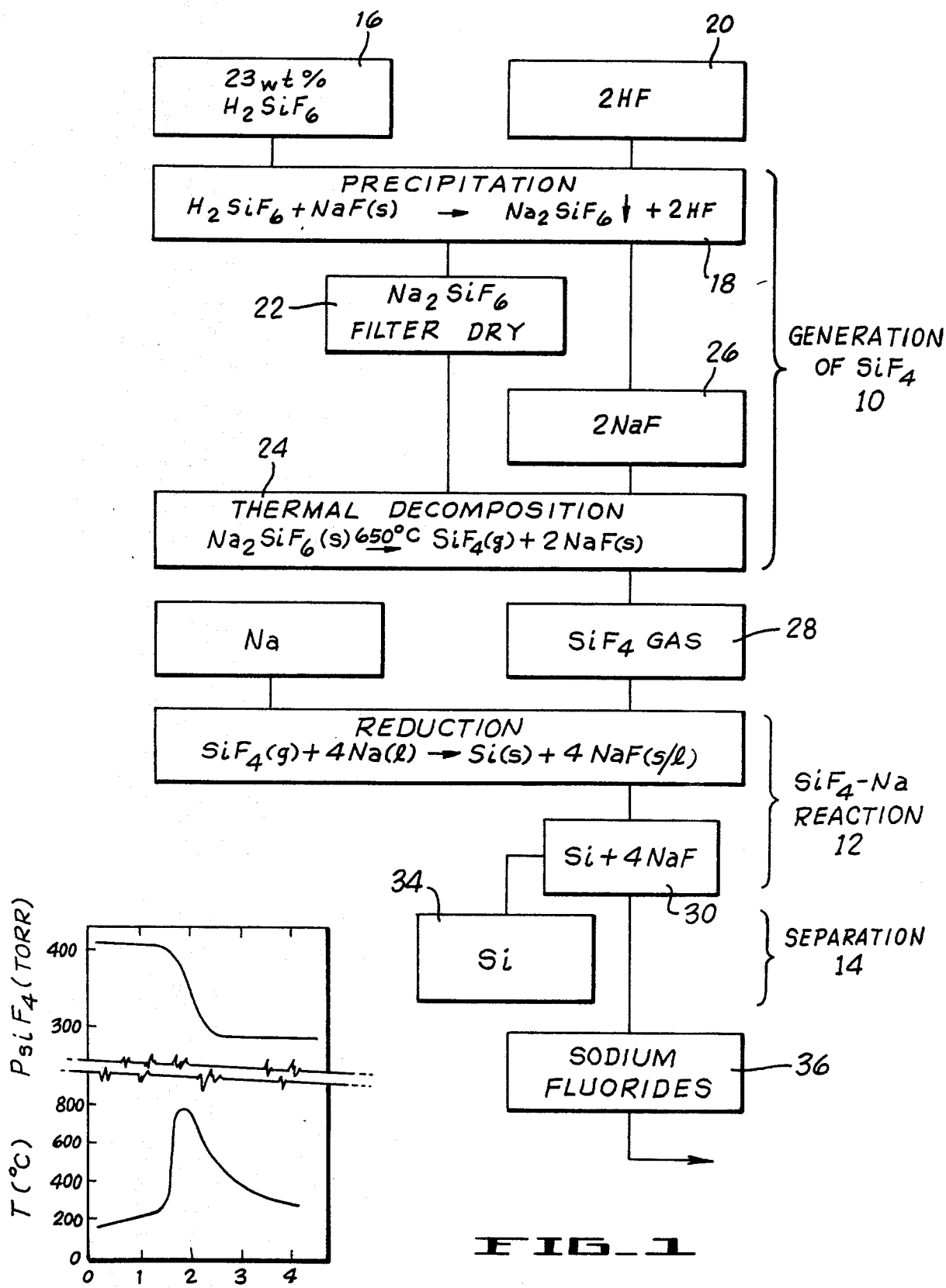
FIG_1
FIG_2

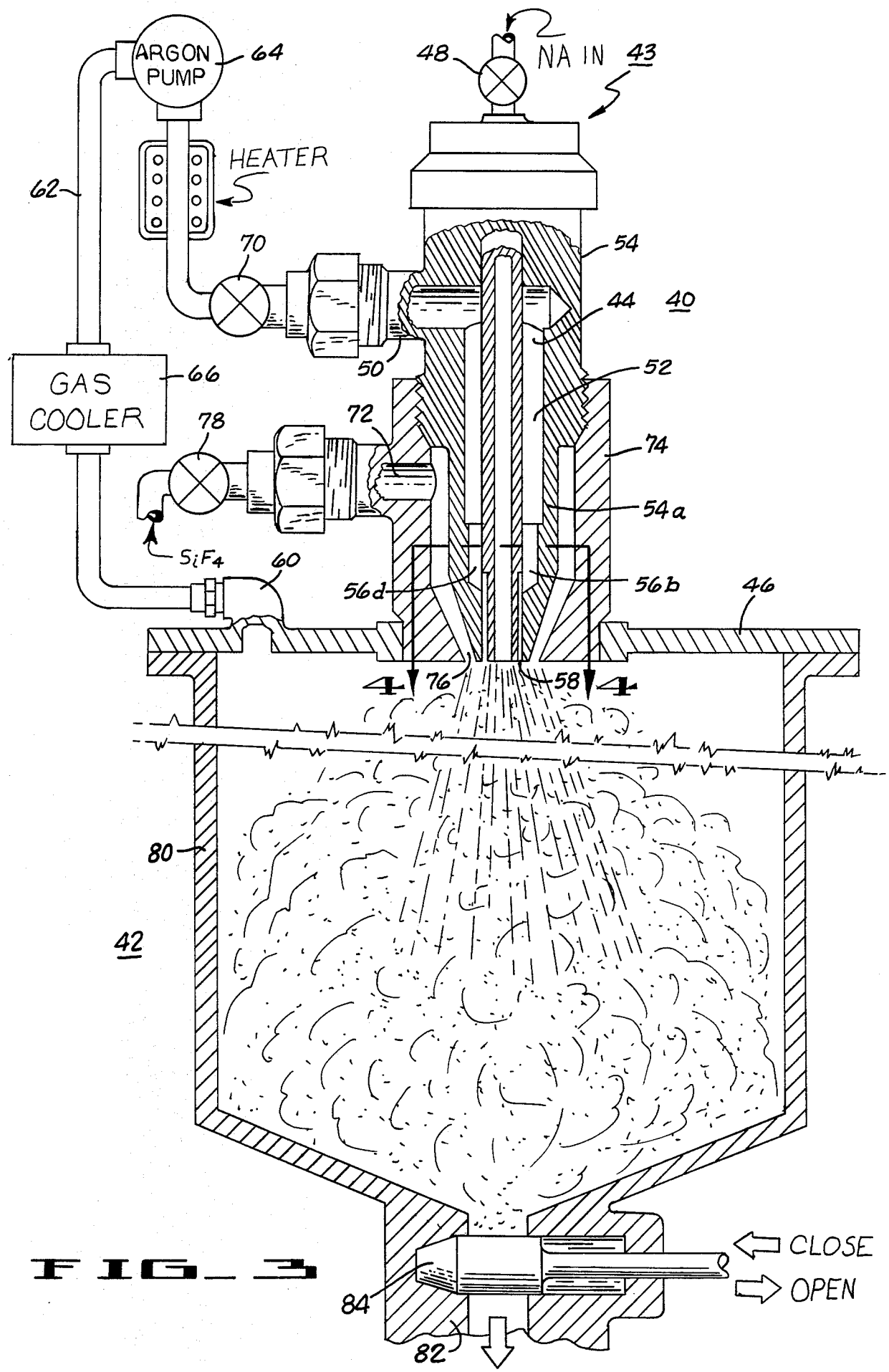

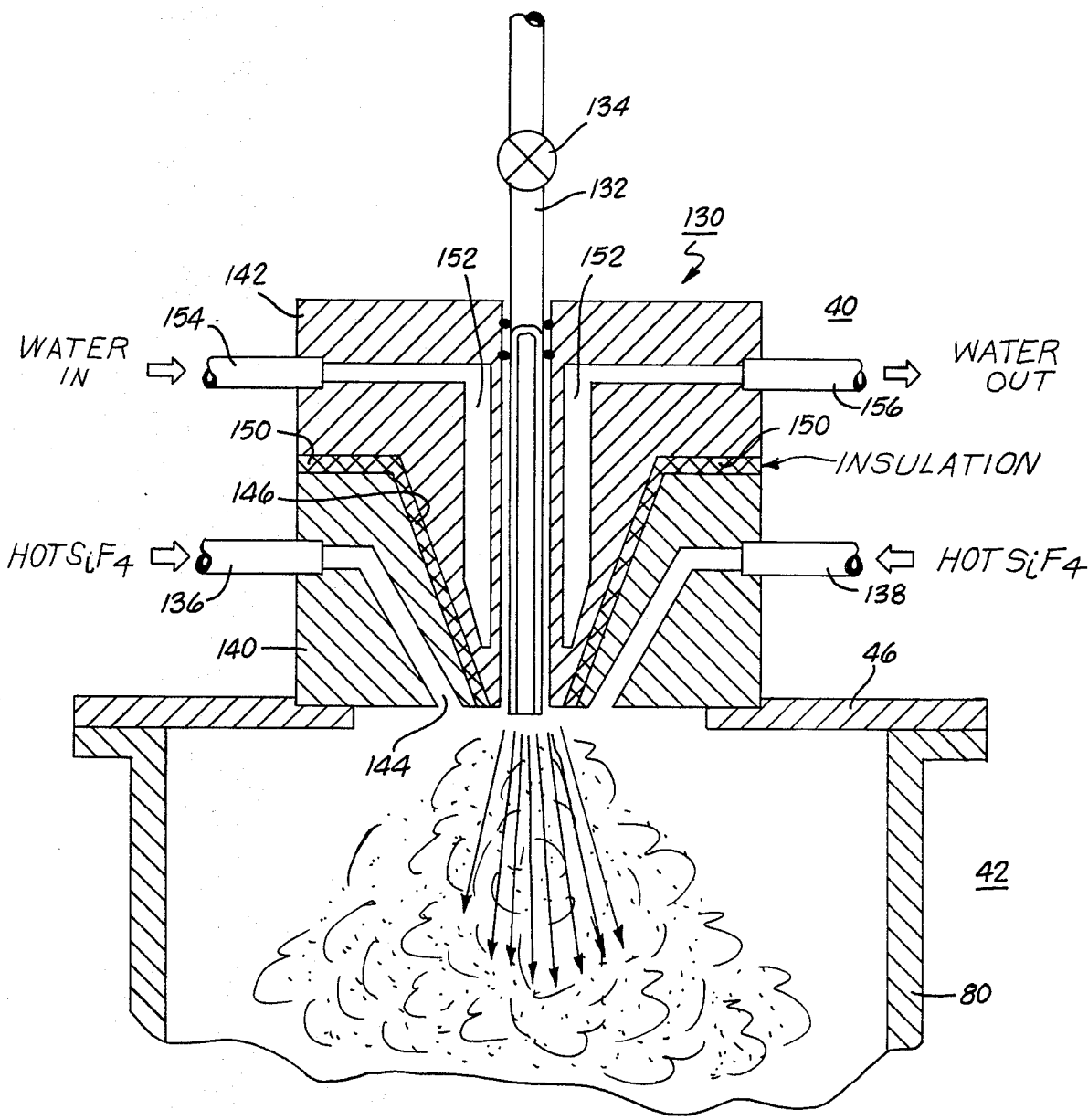
FIG_6

PROCESS AND APPARATUS FOR OBTAINING SILICON FROM FLUOSILICIC ACID

ORIGIN OF INVENTION

The U.S. Government has rights in this invention pursuant to JPL/DOE Contract No. 954471-NAS 7-100 awarded by the U.S. Department of Energy.

This invention together with the inventions described in the related applications below, evolved (in-part) from research efforts aimed at preparing low cost, high purity silicon for solar cells. The results of that research are contained in the following reports prepared for JPL/DOE:

Quarterly Progress Report No. 1, "Novel Duplex Vapor-Electrochemical Method for Silicon Solar Cell", by: V. J. Kapur and L. Nanis, August 1976;

Quarterly Progress Report No. 2 and 3, "Novel Duplex Vapor-Electrochemical Method for Silicon Solar Cell", by: V. J. Kapur and L. Nanis, March 1976;

Quarterly Progress Report No. 4, "Novel Duplex Vapor-Electrochemical Method for Silicon Solar Cell", by: V. J. Kapur L. Nanis, and A. Sanjurjo, January 1977;

Quarterly Progress Report No. 5, "Novel Duplex Vapor-Electrochemical Method for Silicon Solar Cell", by: V. J. Kapur, L. Nanis, and A. Sanjurjo, February 1977;

Quarterly Progress Report No. 6, "Novel Duplex Vapor-Electrochemical Method for Silicon Solar Cell", by: V. J. Kapur, L. Nanis, and A. Sanjurjo, March 1977;

Quarterly Progress Report No. 7, "Novel Duplex Vapor-Electrochemical Method for Silicon Solar Cell", by: V. J. Kapur, L. Nanis, and A. Sanjurjo, April 1977;

Quarterly Progress Report No. 8, "Novel Duplex Vapor-Electrochemical Method for Silicon Solar Cell", by: V. J. Kapur, L. Nanis, and A. Sanjurjo, February 1978;

Quarterly Progress Report No. 9, "Novel Duplex Vapor-Electrochemical Method for Silicon Solar Cell", by: V. J. Kapur, L. Nanis, A. Sanjurjo, and R. Bartlett, April 1978;

Quarterly Progress Report No. 10, "Novel Duplex Vapor-Electrochemical Method for Silicon Solar Cell", by: V. J. Kapur, L. Nanis, K. M. Sancier, and A. Sanjurjo, July 1978;

Quarterly Progress Report No. 11, "Novel Duplex Vapor-Electrochemical Method for Silicon Solar Cell", by: V. Kapur, K. M. Sancier, A. Sanjurjo, S. Leach, S. Westphal, R. Bartlett, and L. Nanis, October 1978;

Quarterly Progress Report No. 12, "Novel Duplex Vapor-Electrochemical Method for Silicon Solar Cell", by: L. Nanis, A. Sanjurjo, and S. Westphal, January 1979;

Quarterly Progress Report No. 13, "Novel Duplex Vapor-Electrochemical Method for Silicon Solar Cell", by: L. Nanis, A. Sanjurjo, K. Sancier, R. Bartlett, and S. Westphal, April 1979;

Quarterly Progress Report No. 14, "Novel Duplex Vapor-Electrochemical Method for Silicon Solar Cell", by: L. Nanis, A. Sanjurjo, and K. Sancier, July 1979;

Quarterly Progress Report No. 15, "Novel Duplex Vapor-Electrochemical Method for Silicon Solar Cell", by: L. Nanis, A. Sanjurjo, and K. Sancier, November 1979;

Draft Final Report, "Novel Duplex Vapor-Electrochemical Method for Silicon Solar Cell", by: L. Nanis, A. Sanjurjo, K. Sancier, and R. Bartlett, March 1980; and Final Report, "Novel Duplex Vapor-Electrochemical Method for Silicon Solar Cell", by: L. Nanis, A. Sanjurjo, K. Sancier, and R. Bartlett, March 1980.

The subject matter of the aforementioned reports are incorporated herein by reference.

REFERENCE TO RELATED APPLICATIONS

Other copending United States patent applications relating to the general subject matter of this invention, assigned to the same assignee and incorporated herein by reference are as follows:

Process and Apparatus for Obtaining Silicon from Fluosilicic Acid, Ser. No. 337,136 filed Jan. 5, 1982 by Angel Sanjurjo;

Process and Apparatus for Casting Multiple Silicon Wafer Articles, Ser. No. 453,718 filed Dec. 27, 1982 by Leonard Nanis;

Process and Apparatus for Obtaining Silicon from Fluosilicic Acid, Ser. No. 453,337 filed Dec. 27, 1982 by Angel Sanjurjo and Leonard Nanis;

Process and Apparatus for Obtaining Silicon from Fluosilicic Acid, Ser. No. 453,596 filed Dec. 27, 1982 by Kenneth M. Sancier;

Process and Apparatus for Obtaining Silicon from Fluosilicic Acid, Ser. No. 453,456 filed Dec. 27, 1982 now U.S. Pat. No. 4,442,082 by Angel Sanjurjo; and Process and Apparatus for Obtaining Silicon from Fluosilicic Acid, Ser. No. 453,734 filed Dec. 27, 1982 by Angel Sanjurjo.

BACKGROUND OF THE INVENTION

Field of Invention

Silicon is, at present, the most important material in modern semiconductor technology and is finding increased use in solar cells for the photovoltaic generation of electricity. In view of the importance of the solar cell application, the stringent requirements for purity and low cost and further in view of the orientation of the work done, the process and apparatus is described primarily in the context of production of silicon for solar cell use. However, it is to be understood that both the process and apparatus used are generally useful in the production of silicon for whatever end use.

A major deterrent to the development of practical solar photovoltaic systems is the cost of high purity silicon. With todays technology, approximately twenty percent of the total cost of a silicon solar cell is ascribed to the silicon material alone. That is, the cost of the silicon material produced by the conventional hydrogen reduction of chlorosilanes constitutes at least twenty percent of the cost of producing the cell. It is estimated that the cost of the silicon must be reduced by almost an order of magnitude before silicon solar photovoltaic panels will prove to be economically feasible as a power source. The fact that the chlorosilane processes require multiple separations, are so energy intensive and require such large capital investments indicate that cost of the silicon can not be reduced sufficiently to make silicon solar cells economically feasible without a major process change. As a consequence, an approach to the production of solar grade silicon which is less complex, less energy intensive and which requires less capital equipment is required.

Technical Field of the Invention

It has been found that silicon of more than sufficient purity to meet the solar cell applications can be produced within the economic requirements from the metallic reduction of silicon fluoride. Preferably, the silicon fluoride is prepared from an aqueous solution of fluosilicic acid, a low cost waste by-product of the phosphate fertilizer industry by treatment with a metal fluoride which precipitates the corresponding fluosilicate. This salt is filtered, washed, dried and thermally decomposed to produce the corresponding silicon tetrafluoride and metal fluoride which can be recycled to the precipitation step. The silicon tetrafluoride is then reduced by a suitable reducing metal and the products of reactions are treated to extract the silicon. Each of the steps is described in detail using sodium as typical reducing agent, and sodium fluoride as typical precipitating fluoride but the concept applies as well to other reducing metals and metal fluorides that can reduce silicon fluoride and form fluosilicates.

The process in one form is described in detail in an article entitled Silicon by Sodium Reduction of Silicon Tetrafluoride authored by A. Sanjurjo, L. Nanis, K. Sancier, R. Bartlett and V. J. Kapur in the Journal of the Electrochemical Society Vol. 128, No. 1, January 1981 and the subject matter of that article is specifically incorporated herein by reference.

Background

There are available systems for the production of silicon utilizing some of the reactions of the present system. For example, Joseph Eringer in U.S. Pat. No. 2,172,969 describes a process wherein sodium silicofluoride is mixed with sodium in powder form and placed in a crucible which is heated and in the upper part of which two pieces of copper wire gauze are placed parallel to each other. The space between the pieces of gauze, which can also be heated, is filled with copper wool. When the crucible has been filled and closed, it is heated to about 500° C. At this temperature, reaction takes place and silicon and sodium fluoride are formed whereby the silicon which is mechanically expelled by the sudden increase in pressure is collected in chambers or towers connected to the furnace.

The equation of the reaction is as follows:

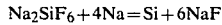
$$Na_2SiF_6 + 4Na = Si + 6NaF$$

or this can be expressed:

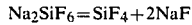
$$Na_2SiF_6 = SiF_4 + 2NaF$$

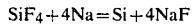
$$SiF_4 + 4Na = Si + 4NaF$$

After the reaction product has been cooled at least to 200° C. it is finely divided and is treated with water or heat treated with dilute 1:1 sulfuric acid. Hydrogen fluoride gas is liberated (which latter can then be made into hydrofluoric acid or a metallic fluoride) metallic sulphates are produced and the silicon separates out on the surface in amorphous form as shining metallic froth.

The reaction expressed in equation form is:

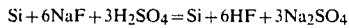
$$Si + 6NaF + 3H_2SO_4 = Si + 6HF + 3Na_2SO_4$$

After the silicon has been separated from the metallic sulphate solution, it is again washed and is dried at 80° C. The silicon obtained in this way is in the form of an impalpable redish or grey-brown powder which discolors strongly and which, even if the raw products were impure, contains a minimum of 96–97% silicon. The yield amounts to about 87% of the theoretically possible yield.

Robert Aries reports in U.S. Pat. No. 3,041,145 that attempts made to reduce silicon halides by the use of sodium vapor have not led to a commercially successful process. He gives as an example the process discussed in the Eringer patent, supra, and points out 96%–97% purity is entirely outside the range of purity required for silicon to be used for photocells, semiconductor rectifiers, diodes, and various types of electronic equipment. As has already been discussed, the conventional hydrogen reduction of chlorosilanes especially with the electrolytic deposition techniques used, is too energy intensive to be economical.

Aries ascribes the purity problem to impurities in the sodium used in the reduction reaction and teaches that further elaborate and expensive purification of the purest available commercial grade silicon is required to produce silicon of solar or semiconductor grade. More recently, V. J. Kapur in U.S. Pat. No. 4,298,587 also supports the view that such purification is required. In fact, this patent teaches that both the sodium and the silicon tetrafluoride must be purified using an energy intensive technique comparable to the electrolytic deposition systems of the chlorosilane reduction processes.

It has been determined that silicon of the desired grade is obtained without the elaborate purification of commercial grade sodium or silicon tetrafluoride obtained from the fluosilicic acid (from the reaction shown above) provided the reduction reaction is carried out in such a way that it goes to completion, the proper environment is maintained during the reduction reaction and the product is properly isolated from contaminating atmosphere and container walls until the reaction is complete and solid silicon which is below reaction temperature is formed and separated. In copending patent application entitled Process and Apparatus for Obtaining Silicon from Fluosilicic Acid, Ser. No. 337,136 filed Jan. 5, 1982 by Angel Sanjurjo and assigned to the present assignee, the isolation from the container is carried out using a powdered substance so that the reaction product does not adhere and can be removed by a simple dumping process. The system is successful and may be used in connection with the present process. However, since reaction products in the present process are produced in free flowing powder form before contacting reaction chamber walls, the powder container is not necessary.

The present invention is particularly novel at the part of the process which deals with the manner of carrying out the reaction between $SiF_4$ and an alkaline earth metal (e.g. Na) to produce Si. In carrying out the reaction, gaseous $SiF_4$ and Na, as reactants, are sprayed or injected into a reaction chamber to form a dispersion (fine mist). Both U.S. Pat. No. 4,188,368 to Wolf et al. and U.S. Pat. No. 4,102,765 to Fey et al. deal with reactions where Si is produced using finely divided injected feed stocks. Keeton U.S. Pat. No. 4,169,129 discloses an apparatus and process for pulse feeding a fine spray of liquid Na into a Si production reactor. Bagley U.S. Pat. No. 2,995,440 and Baker U.S. Pat. No. 3,069,255 disclose procedures for introducing molten Na into a reaction vessel with chlorides of titanium, while Hill U.S.

Pat. No. 2,890,953 discloses a procedure for adding atomized liquid Na in a reactor (also with chlorides of titanium). Maurer (U.S. Pat. No. 2,941,867) separately charges a reducing metal reactant and a halide of a high melting metallic element from group II, III, IV, V and VI of the periodic table both in the fluid state into an externally cooled reaction zone. However, none of these patents deals successfully with the important problem of feed nozzle plugging.

In order to appreciate the problem, consider (as noted above) that when liquid Na at 150° C. contacts $SiF_4$, a rapid exothermic reaction takes place. The Na burns in the $SiF_4$ atmosphere to produce Si and NaF. Since Na melts at 98° C., in principle, liquid Na at temperatures below 140° C. can safely be drop-fed into a reactor kept under a constant $SiF_4$ pressure. The reaction takes place at the bottom of the reactor which is kept at temperatures above 200° C. Experimentally, it is observed that due to the heat generated by the reaction, the Na injection nozzle overheats and the reaction takes place at the nozzle causing a build up of reaction products which plug the nozzle, and thus, the Na feeding system. Further, the reaction products produced by the systems disclosed in the patents are in a form that is difficult to separate. In view of the stringent purity requirements for solar grade silicon, separation techniques that tend to introduce impurities are distinctly disadvantageous.

The present invention is specifically concerned with performing the Na/$SiF_4$ reaction in such a manner that it takes place far enough away from the entry region of the reactants that they are freely introduced. Copending patent application Ser. No. 453,456, now U.S. Pat. No. 4,442,082 filed in the name of Angel Sanjurjo and assigned to the assignee of the present invention deals with this problem by forcefully jetting reactants into the reaction chamber. In a preferred embodiment of the present invention, the reaction is performed in such a manner that the reactants ($SiF_4$ and Na) are broken up and intermingled as a fine mist (dispersion) so that they react and solidify into a fine free flowing powder (NaF and Si) when before collision with a reaction chamber wall. Thus, the reaction product (powder) does not stick to the reaction chamber wall. In this manner, the reaction process is readily made continuous, and the powder reaction products are easily separated by either leach or melt separation.

SUMMARY AND OBJECTS OF INVENTION

In carrying out the present invention sodium fluosilicate $Na_2SiF_6$ is precipitated from fluosilicic acid followed by thermal decomposition of the fluosilicate to silicon tetrafluoride $SiF_4$. The $SiF_4$ is then reduced by an alkali metal, preferably Na, to obtain silicon which is separated from the mix, either by leach or melt separation. The reduction reaction is carried out by injecting finely divided sodium and gaseous $SiF_4$ into a reaction chamber. The reactants introduced and intimately intermixed to form a fine mist (dispersion)). The rate and temperature of reactant introduction causes the reaction to take place far enough away from the injection or entry region so that there is no plugging at the entry area and thus, the reactants are freely introduced. The reaction is carried out in such a manner that the intimately intermingled (mist or dispersion) reactants result in reaction products (Si and NaF) in the form of free flowing powders which powders are easily removed and separated directly and continuously either by leach or melt separation without contamination.

The invention has for its principal object the provision of a process for obtaining silicon of sufficient purity to produce solar photovoltaic cells inexpensively enough to make their use practical.

A further object of this invention is to provide a process by means of which silicon can be obtained which is substantially free of impurities starting with relatively inexpensive and impure fluosilicic acid.

Another object of this invention is to provide a process for producing Si wherein $SiF_4$ and a reductant, preferably Na, are introduced into a reactor as a finely divided mist and react to form a free flowing powder which does not adhere to reactor walls.

Another object of the invention is to provide a process for producing solar grade Si by reaction of $SiF_4$ and the reductant Na in the form of a finely divided mist at a rate and temperature that causes the reduction to take place at a location removed from the entry so that the reaction products do not prevent introduction of either of the reactants into the reactor and the reactants form a free flowing powder reaction product whereby the Si is readily separated from the reaction products continuously and directly.

The novel features which are believed to be characteristic of the invention are set forth with particularity in the appended claims. The invention itself, however, both as to its organization and method of operation, together with further objects and advantages thereof may best be understood by reference to the following description taken in connection with the accompanying drawings.

BRIEF DESCRIPTION OF THE DRAWINGS

FIG. 1 is a flow diagram illustrating a preferred embodiment of the process for producing high purity silicon conveniently by the leach process but alternatively by the melt process;

FIG. 2 is a graph illustrating the time, temperature and pressure characteristics of the silicon fluoride and sodium reaction showing time in minutes plotted along the axis of abscissae and temperature in degrees C. and pressure (torr) plotted along the axis of ordinates;

FIG. 3 is a somewhat diagrammatic partially broken away and partial central vertical section through a reactor unit showing a nozzle arrangement for introducing reactants (Na and $SiF_4$) into a reaction chamber and breaking them up into a fine mist whereby the reaction products form a free flowing powder upon reaction according to the present invention;

FIGS. 5 and 6 are diagrammatic central vertical sections, partially broken, through two other reaction units similar to the one of FIG. 3 showing other forms of reactant introducing nozzles according to the present invention.

DESCRIPTION OF PREFERRED EMBODIMENTS

Figure 4:
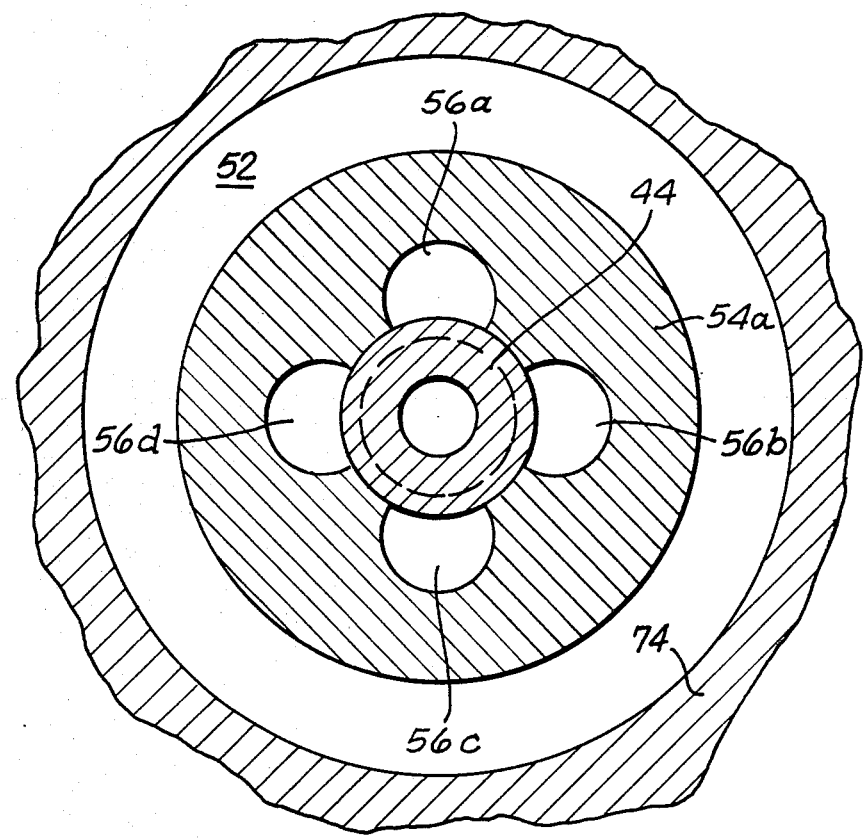
FIG. 4 is a sectional view, partially broken away, taken along section lines 4—4 of FIG. 3 showing constructional details of the exit ports of the reactant introducing nozzle which are responsible for forming the mist of reactants.

A preferred embodiment of the process for production of pure silicon starting with inexpensive commercial grade fluosilicic acid is illustrated in the flow diagram of FIG. 1. The overall process consists of three major operations which encompass a series of steps. The first major operation (shown in brackets 10 in the drawing) includes the step of precipitation of sodium fluosilicate from fluosilicic acid followed by generation of silicon tetrafluoride gas. The second major operation (brackets 12 on the drawing) comprises the reduction of silicon tetrafluoride to silicon, preferably by sodium and the third operation (brackets 14) involves the separation of silicon from the mixture of silicon and sodium fluoride.

Consider first the steps of generation of silicon tetrafluoride (operation 10). The preferred starting source of silicon is an aqueous solution of fluosilicic acid ($H_2SiF_6$), a waste product of the phosphate fertilizer industry, that is inexpensive and available in large quantities. Fluosilicic acid of commercial grade [23 weight percent (w%)] has also been used directly as received without purification or special treatment and is shown as the silicon source 16 in FIG. 1. As another alternative, fluosilicic acid is obtained by treating silica, or silicates (natural or artificially made) with hydrogen fluoride. The $SiF_6$ ion is then precipitated in sodium fluosilicate $Na_2SiF_6$, by adding a sodium salt to the solution (step 18). Other salts such as NaF, NaOH, NaCl, or similar salts of the elements in groups IA and IIA of the periodic table are all candidates. The major selection criteria are, low solubility of the corresponding fluosilicate, high solubility of impurities in the supernatant solution, high solubility of the precipitating fluoride salt, and non-hygroscopic character of the fluosilicate.

Based on these criteria, the preferred fluosilicates in order of preference are $Na_2SiF_6$, $K_2SiF_6$ and $BaSiF_6$. Using the preferred NaF as the precipitating salt, the hydrogen of the fluosilicic acid is displaced by the sodium to form sodium fluosilicate, a highly stable, non-hygroscopic, white powder, and sodium fluoride which is recycled. In equation form the reaction is

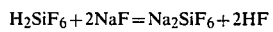

$$H_2SiF_6 + 2NaF = Na_2SiF_6 + 2HF$$

As an example, sodium fluosilicate was precipitated by adding solid sodium fluoride directly to the as received commercial grade fluosilicic acid 18. The yield was a supernatant liquid containing mostly HF and some NaF and $H_2SiF_6$ along with the sodium fluosilicate. HF is also given off (20). The supernatant fluid was removed and the sodium fluosilicate washed with cold distilled water to remove any remaining HF and $H_2SiF_6$. After filtering and drying in an oven at 200° C., a minimum yield of 92% of pure sodium fluosilicate 22 (determined by X-ray diffraction) was obtained. The product sodium fluosilicate is a nonhygroscopic white powder that is very stable at room temperature and thus provides an excellent means for storing the silicon source before it is decomposed to silicon tetrafluoride.

Precipitation under the just described conditions acts as a purification step, with most impurities in the original fluosilicic acid staying in solution. This effect is increased by adding suitable complexing agents to the fluosilicic acid solution previous to the precipitation. Both inorganic complexing agents such as ammonia and organic agents such as EDTA (ethylenediaminetetraacetic acid) help to keep transition metal ions in solution during precipitation of the fluosilicate.

The fluosilicate is thermally decomposed 24, thus,

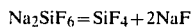

$$Na_2SiF_6 = SiF_4 + 2NaF$$

to give the solid sodium fluoride, which is recycled 26, and to generate the $SiF_4$ gas 28. The decomposition does not take place appreciably at temperatures below 400° C. Therefore, impurities which are volatile at this temperature can easily be removed by a vacuum treatment below this temperature. The decomposition of Na takes place at temperatures between 500° and 700° C. Impurities left in the solid phase are typically transition metal fluorides such as Fe, Ni, Cu, etc., whose volatility at temperatures below 700° C. is very low and therefore do not contaminate the $SiF_4$ gas. The gas thus produced can be fed directly to the reduction reactor or it can be stored for future use.

In separate experiments, it was determined that $SiF_4$ gas at a pressure of 0.4 atm is in equilibrium at 650° C. with solid $Na_2SiF_6$ and NaF. Therefore, as $SiF_4$ is needed, the $Na_2SiF_6$ is thermally decomposed (FIG. 1) at 650° C. in a graphite-lined, gas-tight stainless steel retort. Gaseous $SiF_4$ evolved at 650° C. was condensed as a white solid in a storage cylinder (cooled by liquid nitrogen) attached to the retort. The $SiF_4$ gas was allowed to expand by warming of the storage cylinder to room temperature and was fed into the reactor as needed. $SiF_4$ gas prepared in this manner was determined by mass spectrometric analysis to be more pure than commercial grade $SiF_4$, as shown in Table I. Ions formed from the sample gas were identified from the observed mass numbers, isotopic distribution and threshold appearance potentials. The detection limit was better than 0.005%. Positively identified gaseous impurities are listed in Table I; no metallic impurities were detected. Peaks corresponding to B compounds, such as $BF_3$, were specially checked, but none were found.

Although the $SiF_4$ produced from $H_2SiF_6$ has less impurity, the commercial grade $SiF_4$ was also used for experimental convenience. The possible presence of metallic impurities in commercial $SiF_4$ was determined by bubbling the gas through high purity water and treating the resulting slurry with an excess of HF to drive off Si as $SiF_4$. The final clear solution was then analyzed by plasma emission spectroscopy (PES). The results are listed in Table II, together with PES analysis of the waste by product $H_2SiF_6$ and the NaF used to precipitate $Na_2SiF_6$ (18 and 22 FIG. 1).

TABLE I

| Mass spectrometric analysis of $SiF_4$ | | |
| --- | --- | --- |
| Ion | $SiF_4$ prepared from $H_2SiF_6$ (%) | $SiF_4$ commercial (%) |
| $SiF_3^+$ | 96.9 | 93.6 |
| $Si_2OF_6^+$ | 3.04 | 4.24 |
| $SiOF_2^+$ | (—) | 1.79 |
| $CCl_3^+$ | (—) | 0.159 |
| $SiO_2F_2^+$ | 0.076 | 0.098 |
| $Si_2O_2F_4^+$ | (—) | 0.081 |
| $SO_2^+$ | (—) | 0.035 |

Comparison of the first two columns of Table II with column three shows that the concentration of some elements, e.g., Li, B, V, Mn, Co, K, and Cu, were unchanged by precipitation of $Na_2SiF_6$ whereas the elements Mg, Ca, Al, P, As, and Mo were diminished by a factor of 5-10. Some elements were concentrated into the $Na_2SiF_6$, namely Cr, Fe and Ni. The fourth column in Table II is representative of the impurity content to be found in $SiF_4$ gas prepared on a commercial scale. The low content of P is of special significance for both semiconductor and solar cell applications. Elements known to reduce solar cell efficiency (V, Cr, Fe, Mo)

are uniformly low in commercial grade SiF$_4$. Only Mn, As, and Al are of comparable concentration in both Na$_2$SiF$_6$ and SiF$_4$ at the 1 parts per million (ppm) by weight or less level.

TABLE II

| Element | Plasma emission spectroscopy analysis, ppm (wt) | | | |
|---|---|---|---|---|
| | H$_2$SiF$_6$ | NaF | Na$_2$SiF$_6$ | SiF$_4$ |
| Li | 0.1 | (—) | 0.2 | 0.01 |
| Na | 460 | (—) | (—) | 1.8 |
| K | 9.0 | (—) | 8.0 | 0.3 |
| Mg | 55 | (—) | 6.4 | 2.3 |
| Ca | 110 | 10 | 18 | 1.6 |
| B | 1.0 | (—) | 0.8 | <0.01 |
| Al | 8.0 | <2.5 | 1.3 | 1.2 |
| P | 33 | (—) | 5 | 0.08 |
| As | 8.8 | (—) | 0.2 | 0.28 |
| V | 0.3 | <5 | 0.3 | <0.01 |
| Cr | 0.8 | <3.5 | 8.8 | <0.01 |
| Mn | 0.2 | <4 | 0.4 | 0.16 |
| Fe | 13 | <7 | 38 | 0.04 |
| Co | 0.54 | (—) | 0.7 | <0.01 |
| Ni | 1.17 | <8 | 4.2 | <0.01 |
| Cu | 0.12 | <4 | 0.6 | <0.01 |
| Zn | 1.4 | (—) | 1 | <0.01 |
| Pb | 14.5 | (—) | 5 | 0.03 |
| Mo | 11 | (—) | 1.0 | <0.01 |

The SiF$_4$/Na reaction, the central operation of the Si production process (FIG. 1), is the reduction of SiF$_4$ by Na according to the reaction

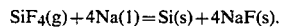

$$SiF_4(g) + 4Na(l) = Si(s) + 4NaF(s).$$

This reaction is thermodynamically favored at room temperature, however, it has been found experimentally that Na has to be heated to about 150° C. before any appreciable reaction can be observed. Once the reaction has been initiated the released heat raises the temperature of the reactant (Na) which in turn increases the reaction rate. Under adiabatic conditions, a temperature of 2200 K. is predicted for the reaction with the stoichiometric quantities of SiF$_4$ and Na. In practical reactors, rapid consumption of gaseous SiF$_4$ produces a pressure decrease. The kinetic behavior of the Na—SiF$_4$ reaction is complex because of the interplay of several factors, e.g., pressure of SiF$_4$, vaporization of Na, local temperature, porosity of two solid products, and transport of SiF$_4$ and Na vapor through the product crust that forms on the liquid Na.

Although only preliminary studies have been made of the kinetics, the general features of this reaction have been surveyed. In a series of experiments to estimate reaction temperature 5 grams of Na were loaded in a Ni crucible (3 cm ID, 4 ccm high) and heated in SiF$_4$ initially at 1 atm pressure. The Na surface tarnished at around 130° C., with the formation of a thin brown film. As the temperature increased, the color of the surface film gradually changed from light brown to brown and finally to almost black. The SiF$_4$/Na reaction became rapid at 160°±10° C. and liberated a large amount of heat, as indicated by a sudden rise in reaction temperature. The pressure in the reactor typically decreased slightly until the temperature increased sharply, with an associated rapid decrease in SiF$_4$ pressure. The reaction lasts for several seconds only (until the Na is consumed). For SiF$_4$ pressure below 0.3 atm the reaction mass was observed to glow at a dull red heat. For higher pressure, a characteristic flame was observed. The shortest reaction time (20 sec) and the highest temperatures (about 1400° C.) were obtained when the initial pressure of SiF$_4$ was around 1 atm. In addition, complete consumption of Na was obtained for 1 atm SiF$_4$. When scale-up of this reaction was attempted by loading larger amounts of Na, it was found that as the depth of the Na pool increased, the amount of Na remaining unreacted also increased. The product formed a crust on top of the Na surface, building a diffusion barrier for the reactants. As the barrier thickness increased, the reaction slowed and eventually stopped.

For separation (operation 14 FIG. 1) of the silicon from the products of reduction by the melt separation process, the reaction products are heated until a melt is formed and the NaF is drained off (36) leaving the Si (34) which can if necessary be further purified. The melting and separation process is described in detail in copending Sanjurjo patent application Ser. No. 453,456, now U.S. Pat. No. 4,442,082, supra. Leach separation is described in the copending patent application entitled Process and Apparatus for Obtaining Silicon from Fluosilicic Acid, Ser. No. 337,136 filed Jan. 5, 1982 by Angel Sanjurjo and assigned to the present assignee. In the leach process, the silicon and sodium are removed and combined with water and a selected acid. The resultant silicon and water soluble sodium fluoride are then separated.

Figure 5:
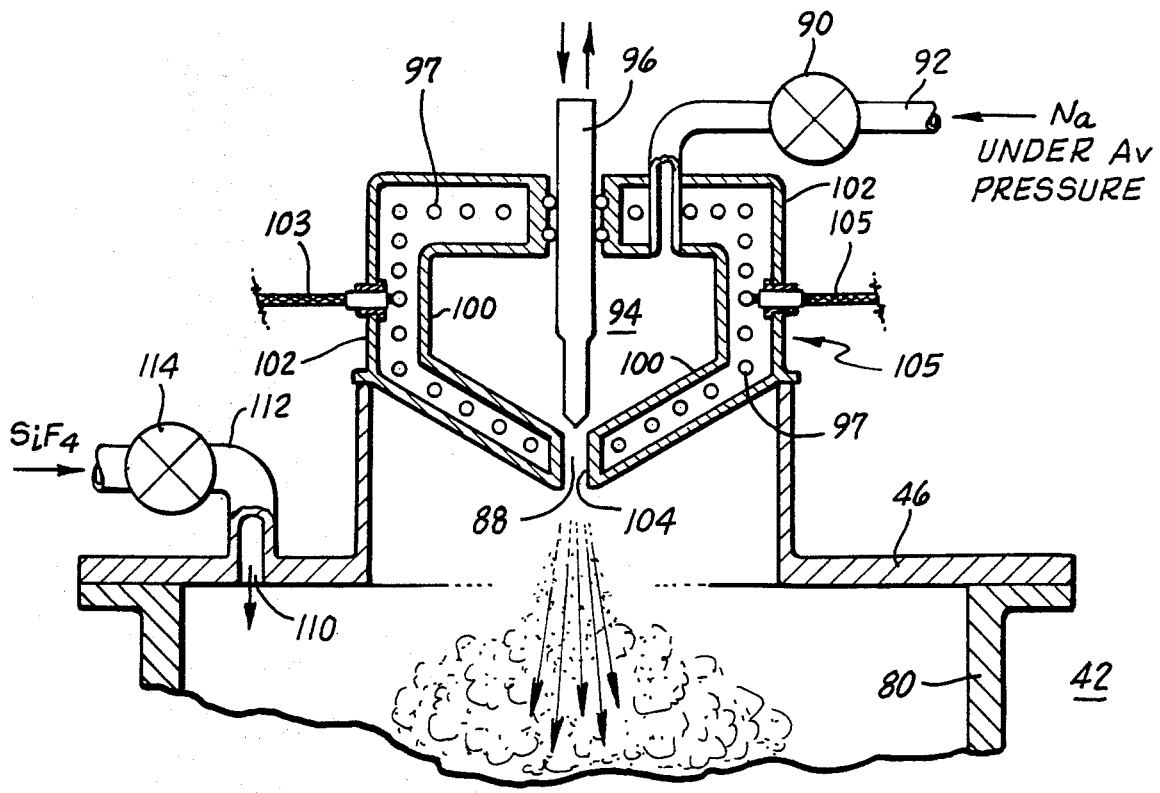

On the basis of studies of the parameters that affect the reaction, a system was designed that is shown with various reactant feed configurations in the central vertical sections through the reactors of FIGS. 3, 5 and 6. It is noted that all of the reactant feed arrangements are specifically designed to break the injected liquid Na reactant up into fine particles and intimately intermix the reactants (Na and SiF$_4$) to form a uniformly mixed dispersion (i.e., a fine mist or spray) so that, upon reaction, the reaction products constitute a finely divided free flowing powder. In addition, the feed arrangements are configured to cause the reduction reaction to take place far enough away from the feed system (into the reactor) positively to prevent build up of reaction products at the entry and, thus, avoid any possibility of plugging of the entering reactants.

In the three nozzle configurations discussed below, the reactant dispersion or mist of intimately intermixed reactants is formed in a different way, viz.: (1) cold Na atomized with a hot inert gas mixed with cold SiF$_4$ (FIG. 3), (2) hot Na sprayed into cold SiF$_4$ (FIG. 5), and (3) cold Na atomized by hot SiF$_4$ (FIG. 6).

(1) Cold Na Atomized by Hot Ar and Cold SiF$_4$

The upper section 40 of the reactor system, shown broken away and somewhat schematically in FIG. 3, constitutes a reactant (Na and SiF$_4$) dispenser and the lower section 42 is the reactor section where the reaction takes place. In this illustrated embodiment, the reactant dispenser section 40 includes a mist generating and dispensing nozzle 43 vertically and centrally disposed in the top flange 46 of the reactor. The mist generating and delivery nozzle 43 is optimally designed to inject or direct the reactants into the reactor in the form of a dispersion (fine mist or spray) and incorporates a vertically and centrally located stainless steel liquid sodium delivery tube 44 which is provided with a conventional control valve 48 for controlling Na flow into the reactor section 42. Na is supplied from a pressurized reservoir (not shown). The inner diameter of the Na delivery tube 44 is selected to provide the desired Na delivery action, viz., assure an appropriate Na stream ejection velocity and Na stream size.

The relatively cold liquid Na (on the order of 100° C.) sprayed through the delivery tube 44 is atomized and heated with hot inert gas such as argon or nitrogen (from about 300° C. to about 600° C.) and then mixed with cold $SiF_4$ (room temperature). In the embodiment illustrated, hot Ar is introduced in mist generating and dispensing nozzle 43 at Ar inlet port 50 and is fed concentrically down around the Na delivery tube 44 through a cylindrical bore 52 in the upper outer body portion 54 of the nozzle 43. The lower end of the cylindrical bore 52 is essentially closed around the lower end of Na delivery tube 44 except that four passages or bores 56a, 56b, 56c and 56d (best seen in the section view of FIG. 4) symmetrically spaced around the central (vertical) axis of the nozzle 43 extend down to communicate with a relatively thin tube-like Ar delivery section 58. The inner wall of the tube-like Ar delivery section 58 is formed by an area located at the lower (exit) end of the Na delivery tube 44 which is necked down or reduced in outer diameter and the outer wall is formed by the surrounding spaced concentric innner bore of the delivery nozzle body 54. This arrangement allows the hot Ar gas to be introduced intimately and concentrically around the cold liquid Na. Thus, the desired heat transfer between the Ar and Na and the desired atomization of the Na is provided. Note here that the Na must be heated to at least 150° C. in order to react with the $SiF_4$.

Atomization of the Na is further aided by the nozzle (43) configuration for delivery of the reactant $SiF_4$. Before considering the $SiF_4$ delivery arrangement, however, note that the atomizing gas (Ar here) is, for economic considerations, recovered and recycled. For this purpose, an Ar outlet port 60 is provided in the top flange 46 of the reactor 42 and connected to the Ar inlet port 50 by Ar circulation or return tubing 62. In order to assure proper recirculation, a conventional gas pump 64 is inserted in the return line 62. Pump 64 also provides the necessary Ar pressure and flow rate properly to atomize the liquid Na injected into the reactor chamber 80. Temperature control of the recirculating Ar is provided by a gas cooler 66 which reduces the temperature of the Ar below that to which it is raised by the Na/$SiF_4$ reaction in the reactor 42 and a heater 68 inserted just prior to the Ar inlet port 50 for final temperature adjustment. For regulation purposes, including system shut down, a conventional control valve 70 is also provided in the Ar return line 62 just prior to the Ar inlet port 50.

In order to bring the reactants together in the reaction zone 61, to provide additional cooling of the body of the delivery nozzle 43 and further to contribute to breaking up the liquid Na into a fine mist, $SiF_4$ is fed into the Na/Ar flow concentrically around the entry portion of the Na delivery tube 44 and Ar delivery exit 58 at an angle to intersect and intimately intermix with the already atomized Na/Ar mixture to form a dispersion or mist. In carrying this out, the $SiF_4$ is brought into the mist generating and dispensing nozzle body by way of an inlet port 72 in the cylindrical lower outer nozzle wall 74 which is sealed at its lower end in the center of the top flange 46 of the reactor 42 and sealed at its upper end around the upper body portion 54 of the nozzle 43. The $SiF_4$ passage in the nozzle 43 is formed by a space between the inner wall of the lower outer body portion 74 and the outer wall of the lower part 54a of the upper body portion 54 that extends down inside it. Note that the spaced opposing surfaces of the two body portions (74 and 54a) are cylindrical where the $SiF_4$ inlet port 72 comes in and reduce in diameter to form spaced nesting cones at their lower extremity so that the reactor entry port 76 is oriented to feed $SiF_4$ inwardly toward the center of the reactor 42 concentrically around the Na/Ar stream. Thus, the $SiF_4$ stream performs its cooling action, contributes to breaking up the reactants and assures intimate and complete mixture of the reactants as a fine mist (dispersion). The $SiF_4$ is fed into the reactor at room temperature and its entry is controlled by a constant pressure valve 78 in order to keep pressure constant in the reactor at from about 0.5 to about 5 atmospheres. That is, as $SiF_4$ is fed concentrically with the hot Na/Ar into the reaction zone, the liquid Na is atomized, a fine mist (dispersion) of reactants is formed and the $SiF_4$/Na reaction takes place forming a fine free-flowing powder of pure Si and NaF and depleting $SiF_4$. The depletion in turn activates the constant pressure valve 78, thus, feeding more $SiF_4$ into the reactor 42. The resultant $SiF_4$ gas flow along with the flow of hot Na and Ar keeps reaction products from reaching the nozzle end of Na feed tube 44. That is, the velocity of the reactants and Ar must be high enough so that the reduction reaction (zone 61) takes place a distance greater than 1 cm from the bottom of the nozzle 43. Keeping the reaction products away from the reactant entry area eliminates plugging of the injection apertures.

The reduction reaction (FIG. 1 operation 12) takes place in the lower reactor section 42 of the reactor system. As previously noted, the reduction reaction is highly exothermic and therefore, additional temperature control may be desirable to remove heat from the reactor and thus help prevent reaction products from moving up near the reactant injection area. For example, additional temperature control may be provided by water cooled tubing (not shown) around the upper portion of the reaction chamber 42. In this connection, note again that it has been found experimentally that Na reacts with $SiF_4$ only above 150° C. Therefore, as long as any cooling coils in cooperation with the Ar and reactant input temperatures and velocities maintain the reactant feed area below this temperature, premature reaction at the feed port is prevented and thus nozzle plugging is prevented.

It is contemplated that the removal and separation of the reaction products will take place on a continuous basis. The physical structure and configuration of the reactor portion 42 of the system is designed to allow such results. As illustrated, the reactor section 42 includes a generally cylindrical reaction product receiving container 80. In order to withstand the high temperatures involved and to avoid contaminating the reaction products, the container 80 is typically composed of high purity graphite. Note here, that due to the configuration of the reactant delivery nozzle 43 and its position relative to the wall of the reaction container 80, the mist of Na and $SiF_4$ will react completely and cool below the melting temperature of NaF whereby essentially all reaction product forms a free flowing powder before hitting a reaction chamber wall. Thus, the reaction product does not adhere to the reaction chamber wall or pick up impurities therefrom.

The bottom of the reaction product receiving container 80 is generally conical in shape with a Si/NaF reaction product removing drain pipe 82 in the center and thus, has the appearance of a common funnel. The drain pipe 82 is shown closed by a movable drain plug 84. The condition illustrated is for a normal run in process with some reaction products (Si and NaF powder) in place. For removal of the free-flowing reaction products, the drain plug 84 is moved to open the drain pipe 82 and the powdered Si and NaF flows freely out the drain pipe 82.

The reaction products discharged via the exit pipe 82, may be treated in any number of ways. For example, the free flowing powders, i.e., the NaF salt and the Si, are easily separated by a conventional aqueous leaching process although a melt process is effective and can be used. For a discussion of aqueous leaching of Si, see previously referenced copending Sanjurjo patent application Ser. No. 337,136 entitled Process and Apparatus for Obtaining Silicon from Fluosilicic Acid filed Jan. 5, 1982 and assigned to the assignee of the present invention. For a description and discussion of a compatible melt process see the copending Sanjurjo patent application (also previously referenced) Ser. No. 453,456 entitled Process and Apparatus for Obtaining Silicon from Fluosilicic Acid filed Dec. 27, 1982 now U.S. Pat. No. 4,442,082 and assigned to the assignee of the present invention.

Illustrated in FIGS. 5 and 6 are other feed heads or nozzles for delivering reactants ($SiF_4$ and Na) into a reaction chamber in such a way that a fine mist is formed, complete reaction takes place to produce free-flowing powder reaction products (Si and NaF) and the reaction takes place sufficiently far from the entry region to prevent plugging of the nozzle discharge orifices. As in the embodiment illustrated and described in connection with FIGS. 3 and 4, the upper section 40 of each of the reactor systems, shown somewhat schematically in FIGS. 5 and 6, constitutes a reactant (Na and $SiF_4$) dispenser. Again, the lower section 42 is, in each case, the section where the reduction reaction takes place. Since the reaction forms the same free-flowing fine powder of reaction products as already described and the free-flowing powder is in each case treated as previously described, the reactor sections 42 are not again fully shown in FIGS. 5 and 6 and are not again described in detail. Parts of the reactor sections 42 which correspond in each of the Figures are given identical reference numerals throughout.

(2) Hot Na Sprayed into Cold $SiF_4$

The reactant delivery and spray forming nozzle 86 in the embodiment illustrated in the central vertical section of FIG. 5 is sealed centrally in the upper flange 46 of the reactor section 42. Again, the reactant Na is fed centrally down through the nozzle 86 into the reaction chamber 80 by way of a centrally located Na delivery orifice 88. Unlike the previous embodiment, wherein the temperature of the Na delivered to the reaction chamber is maintained below its reaction temperature (105° C.), in this embodiment the Na delivered to the reaction chamber 80 is maintained in a temperature range between about 200° C. and about 600° C. The Na feed arrangement shown includes a conventional constant pressure valve 90 controlled Na inlet pipe 92 that feeds directly into an enlarged Na holding chamber 94 in the valve 86 that communicates directly with the Na feed orifice 88 in the bottom thereof. Thus, the Na is supplied under constant pressure, preferably by an external hydraulic piston or by the pressure of an inert gas (not shown), through the inner chamber 94 and Na feed orifice 88 into the reaction chamber 80. In order properly to control the Na flow and aid in breaking it up into the desired fine mist or spray, a control needle 96 is located vertically and centrally and movably sealed so that its position relative to the Na delivery orifice 88 is adjustable. The action of the control needle 96 is much like that found in the nozzle of an ordinary garden hose.

Na temperature control is provided both by controlling the Na supply temperature, e.g., an external Na supply reservoir (not shown), and surrounding the enlarged Na holding chamber 94 with electrical heating coils 97 as part of a heat exchanger 98. The heat exchanger 98 forms a part of the delivery valve body 86 and, as illustrated, is defined by making the Na holding chamber 94 double walled. That is, the inner wall 100 of the holding chamber 94 is concentric with and spaced from the outer wall 102 which also forms the outer wall of the upper portion of the reactant delivery nozzle 86. The outer wall 102 of the heat exchanger 98 effectively acts as a mantle which may, for heat conservation purposes, be surrounded by insulation (not shown). Note that electrical 103 and 105 are shown brought out and insulated from opposite sides of the outer wall 102 of heat exchanger 98 for connection to a source of electrical power. The lower portion of the spaced inner and outer walls 100 and 102 are conical much like nested funnels and the conical inner wall 100 forms the bottom of the Na holding chamber 94. Both walls (100 and 102) are open at the apex of the cones and are sealed together by a short tubular member or orifice wall 104 to form the Na delivery or feed orifice 88.

The Na delivery orifice 88 is of a size (about 0.05 mm to about 5 mm) which in cooperation with the lower end of the adjustable control needle 96 delivers the desired Na spray into the reactor 80. The size of the Na delivery orifice 88 and the position of the Na spray control needle 96 depends on several operating parameters. For example, the orifice diameter must be larger for larger Na droplet sizes and higher liquid feed rates. The orifice diameter also depends on the configuration of the nozzle, as is well known in the art of designing nozzles.

In this embodiment, cold (ambient temperature or lower) $SiF_4$ is supplied to the reactor chamber 80 in substantially stoichiometric quantities and in such a manner that it disperses in the Na spray delivered into the reaction chamber from the Na delivery orifice 88 and reacts therewith. In order to accomplish this, $SiF_4$ is brought into the reactor chamber 80 through a port 110 in the reactor top plate 46 by way of stainless steel tubing 112 through a conventional constant pressure valve 114. Entry of the $SiF_4$/Ar mixture is controlled by the constant pressure valve 114 in order to keep pressure constant in the reactor at from about 0.5 to about 5 atmospheres. That is, as $SiF_4$ is fed into the reactor it forms a dispersion with the Na in the hot zone of the reactor, the $SiF_4$/Na reaction takes place depleting $SiF_4$. The depletion in turn activates the constant pressure valve 114, thus, feeding more $SiF_4$ into the reactor.

This mode of operation allows a high rate of continuous Si production. In the embodiment illustrated in FIG. 5, the inlet Na feed orifice 88 is between about 0.05 mm and about 5 mm in diameter. The liquid Na fed into the reactor vessel 80 is typically maintained at a pressure of about 1 to about 10 atmospheres and a temperature between about 200° C. and about 600° C. Provided the velocity of the Na injected into the reactor chamber 80 (at injection aperture 88) is sufficiently high for the given nozzle, the $SiF_4$/Na reaction takes place far enough down in the reactor vessel 80 to prevent any plugging reaction product build-up at the nozzle output orifice.

The reduction reaction (FIG. 1 operation 12) is completed in the lower reactor section 42 of the reactor system before the reaction produces hit the reactor wall. Again, as in the embodiment of FIG. 3, the fine atomized spray or mist of reactants ($SiF_4$ and Na) results in a reaction product which is a fine free flowing powder consisting of NaF and Si. It is contemplated that the reaction products (NaF and Si) will be separated by a leach process and that the removal and separation of the reaction products take place on a continuous basis.

(3) Cold Na Atomized by Hot $SiF_4$

As in the previous embodiments, the upper section 40 of the reactor system, illustrated in the central vertical section of FIG. 6, constitutes a reactant (Na and $SiF_4$) dispenser and the lower section 42 is the reactor section where the reaction takes place. In this embodiment the delivery nozzle structure and physical interaction of the reactants form the mist (dispersion) in the reactor section 42 and heat exchangers (not shown) which are physically isolated from the reactants for temperature control of the individual reactants as supplied.

For the embodiment illustrated here, the reactant dispenser section 40 includes a mist generating and dispensing nozzle 130 vertically and centrally disposed in the top flange 46 of the reactor. Like the embodiment of FIGS. 3 and 4, the mist generating and delivery nozzle 130 is optimally designed to break the reactants up into a fine mist (dispersion) or spray and incorporates a vertically and centrally located stainless steel liquid sodium delivery tube 132 which is provided with a conventional control valve 134 for controlling Na flow into the reactor section 42. The inner diameter of the Na delivery tube 132 is selected to provide the desired Na delivery action, viz., assure an appropriate Na stream ejection velocity and Na stream size. The flow rate of liquid Na is controlled by the pressure applied to a Na reservoir (not shown) connected to supply the Na delivery tube 132. Pressure to the Na reservoir may be applied either hydraulically or with a suitable inert gas such as Ar.

In this embodiment, the $SiF_4$ is heated (externally) and delivered to the mist generating and delivery nozzle 130 at a temperature of between about 200° C. and 600° C. and directed into the spray of the relatively cold liquid Na (on the order of 100° C.) sprayed through the delivery tube 132 as the two reactants enter the reaction chamber 80. This approach has the advantage that the nozzle 130 is less likely to be clogged, especially if the velocity of the Na stream is high enough. The disadvantage is that hot $SiF_4$ may react with any materials that it contacts and extract impurities therefrom. This effect is minimal, however, when the contacted materials are all materials such as high purity graphite or corrosion resistant alloys.

In order to bring the reactants together in the reaction zone and aid in breaking up the liquid Na into a fine mist, the hot $SiF_4$ is fed into the Na flow concentrically around the delivery end of the Na delivery tube 132 at an angle to intersect and atomize the Na stream and intimately intermix therewith thereby to form a dispersion (fine mist) of the reactants. In carrying this out, the hot $SiF_4$ is brought into the mist generating and dispensing nozzle body 130 by way of a pair of inlet ports 136 and 138 on opposite sides of the cylindrical lower $SiF_4$ delivery portion 140 of nozzle 130 which is sealed at its lower end in the center of the top flange 46 of the reactor 42 and sealed at its upper end around the upper cylindrical body portion 142 of the nozzle 130. The $SiF_4$ passage in the nozzle 130 is formed by a conical $SiF_4$ cavity 144 in the cylindrical lower body portion 140. By bringing the $SiF_4$ input ports 136 and 138 into opposite sides of the upper and (larger diameter) part of the conical $SiF_4$ delivery cavity 144, delivery of the hot gas is more uniform throughout the inwardly and downwardly sloping cavity and, thus, more uniformly delivered into the cool Na stream. Since the $SiF_4$ is both hot and highly reactive, the lower body portion 140 through which it is fed is preferably made of a material such as a pure graphite to avoid the possibility of introducing contaminants. In view of the fact that the other reactant (Na) is to be introduced cold, it is desirable to insulate the hot reactant ($SiF_4$) feed portion 140 of the nozzle 130 from the upper Na feed tube supporting portion 142 and also to provide some form of cooling arrangement for this part (142) of the nozzle.

The reactant delivery nozzle 130 is constructed to provide both insulation of its parts one from another and also a means of cooling the upper cylindrical body portion 142. To provide for insulation, generally cylindrical upper body portion 142 is provided with a generally conical portion (lower in the figure) 146 which extends (downwardly in the figure) and mates with a similar conical-shaped cavity 148 in the lower cylindrical body portion 140 of the nozzle. A layer of insulating material 150 such as high purity foamed silica is sealed between the two body portions 140 and 142. The cooling arrangement for the upper body portion includes a cylindrical coolant carrying cavity 152 which extends inside the upper body portion 142 of the nozzle 130 concentrically around the Na input tube 132 that extends down the central vertical axis. The coolant, typically water or oil, is brought into the cylindrical colant cavity 152 at an input port 154 (left side of the figure), circulates throughout the cavity 152 and exits at an output port 156 (right side in figure) for cooling and recirculation. Thus, both the insulation 150 between the body portions 140 and 142 of the reactant delivery and atomization nozzle 130 and the coolant circulating in the coolant cavity 152 (in the upper portion 142) serve to prevent heat transfer between the hot $SiF_4$ and cool Na until they have been mixed, atomized, and delivered into the reactor section 42.

The $SiF_4$ is fed into the reactor hot (at a temperature between about 200° C. and 500° C.) and its entry may, as discussed relative to previous embodiments, be controlled by a constant pressure valve (not shown) in order to keep pressure constant in the reactor at from about 0.5 to about 5 atmospheres. That is, as $SiF_4$ is fed concentrically with the Na into the reaction zone, the liquid Na is atomized, the reactants are interspersed as a fine mist (dispersion) and the $SiF_4$/Na reaction takes place forming a fine free-flowing powder of pure Si and NaF and depleting $SiF_4$. The depletion in turn activates the constant pressure valve, thus, feeding more $SiF_4$ into the reactor 42. The velocities of the $SiF_4$ and Na streams should be great enough so that the reaction zone, analogous to a flame, is initiated some distance greater than 1 cm below the injection region and in this way keeps reaction products from reaching the nozzle end of Na feed tube 132. Keeping the reaction products away from the reactant entry area in this manner eliminates plugging of the injection apertures.

Again, the reduction reaction is completed in the lower reactor section 42 (reactor vessel 80) before the reaction products hit the reaction chamber wall. Since the reaction forms the same free-flowing fine powder of reaction products as already described and the free-flowing powder is treated as previously described, the reactor section 42 is not again fully shown and is not again described in detail.

The process sequence shown in FIG. 1 was selected because of the inherent simplicity of the steps and their independent and combined suitability for scale-up. Some purification occurs during precipitation (operation 18, FIG. 1) for Mg, Ca, Al, P, and As due to the high solubility of their fluosilicates and fluosalts. Some concentration takes place for Cr, Fe, and Ni, and this effect may be due to coprecipitation of these elements as fluorides since their fluosilicates are very soluble. From Table II, it is clear that most of the purification is accomplished as a result of the thermal decomposition in step 24 (FIG. 1). Most transition metal fluorides are in very stable condensed phases at the decomposition temperature (650° C.) in step 24 (FIG. 1) and, therefore, will stay in the solid. In addition, volatile fluorides formed during the decomposition of fluosalts such as $Na_2TiF_6$ and $Na_2ZrF_6$ will condense upon cooling of the $SiF_4$ gas stream from step 24. The condensed material is then removed from the gas mainstream by in-line fume particle filtration. The presence of any metallic or dopant impurities was not detected using mass spectrometry (Table I) in either the $SiF_4$ gas produced in the above reaction or in the commercial $SiF_4$ gas. The analysis done on the $SiF_4$ by passing the gas through high purity water was based on the hypothesis that impurities should be hydrolyzed and/or trapped in the $SiO_2$ formed.

The results listed in Table II show that the level of metal impurities in the resulting $SiO_2$ is so low that, for practical purposes, the $SiF_4$ can be considered free of metallic impurities. The Na feed, reactor materials, and possible contamination of the product during handling remain as possible sources of impurities in the Si.

The impurities in Na can be divided roughly into three types according to their tendency to react with $SiF_4$, as classified by the free energy of reaction. The first type of impurity includes aluminum and elements from the groups IA, IIA and IIIB. The free energy of reaction of $SiF_4$ with these impurities ranges from $-100$ to $-200$ kcal/mole $SiF_4$ at room temperature and from $-50$ to $-100$ kcal/mole $SiF_4$ at 1500 K. It is expected, therefore, that even when these impurities are present at the ppm level, they will react with the $SiF_4$ to form corresponding fluorides. Subsequently, the fluorides will be dissolved preferentially in the NaF phase.

The second type impurity includes transition metals such as Mo, W, Fe, Co, Ni, and Cu, and the elements P, As, and Sb. These elements exhibit positive free energies of reaction in excess of 100 kcal/mole $SiF_4$ and are not expected to react with $SiF_4$. However, it is an experimental fact that the silicon resulting from the $SiF_4$/Na reaction contains amounts of Fe, Ni, and Cr in proportion to the concentration of these elements in the Na feed. The mechanism by which these metals are transferred to the silicon has not yet been studied. In any case, the concentration of Fe, Cr, Ni, and also Ti can be decreased by a factor of about $10^4$ to $10^6$ for single-pass directional solidification or the Czochralski crystal-pulling procedures used presently for solar cell manufacture. At the resulting levels, these elements would not be detrimental to solar cell performance.

Boron represents a third type of impurity. The free energy of reaction of this element with $SiF_4$ is positive but small (5–20 kcal/mole $SiF_4$ for temperatures up to 1500 K.); therefore, some partial reaction can be expected and B will be distributed between the NaF and Si phases. It is noted that the levels of the dopant elements B,P, and As in the Si produced by the reaction are the same as in the semiconductor grade silicon used as reference or control. Since it is convenient to have dopant levels as low as possible to permit flexibility in subsequent doping procedures for semiconductor and solar cell applications, the low B and P content of Si produced in this process is of advantage. It is noted that the purity of the silicon produced by the $SiF_4$—Na reaction is, at a minimum, nominally appropriate for solar cell manufacture.

From the foregoing discussion, it will be understood that the objects of the invention have been carried out in that high purity Si can be prepared as a fine free flowing powder using the inexpensive starting materials $H_2SiF_6$ and Na. Favorable thermodynamics of the reduction step, easily controlled kinetics, and abundant availability of inexpensive starting materials make this method attractive. Of special interest for semiconductor applications are the low concentrations of B and P impurities in the product Si. The Si produced by the $SiF_4$/Na reaction, particularly when purified further by directional solidification (e.g., casting), should be a low cost material suitable for the manufacture of solar cells and other semiconductor products.

While particular embodiments of the invention have been shown, it will, of course be understood that the invention is not limited thereto since many modifications in both process and apparatus employed may be made. It is contemplated that the appended claims will cover any such modifications as fall within the true spirit and scope of the invention.

What is claimed is:

1. A process for producing low cost, high purity solar grade silicon by reaction of gaseous silicon tetrafluoride with sodium in substantially stoichiometric quantities to produce a reaction product from which silicon is recovered and wherein said fluoride gas used in the reaction is obtained by thermal decomposition of sodium fluosilicate which is precipitated from aqueous fluosilicic acid generated from phosphate rock conversion to fertilizer, said process comprising:
    (a) carrying out such reaction inside a reaction chamber in such a manner that a substantially free flowing powder reaction product including substantially pure silicon is produced;
    (b) removing the substantially free flowing powder from the said reaction chamber by free flow; and
    (c) separating the said substantially pure silicon from the said other reaction products.

2. A process for producing low cost, high purity, solar grade silicon by reaction of gaseous silicon tetrafluoride with substantially cold sodium which comprises:
    (a) directing the reactants substantially cold liquid sodium and gaseous silicon tetrafluoride into a reaction chamber in substantially stoichiometric quantities for reaction therein;
    (b) directing the said silicon tetrafluoride into said substantially cold liquid sodium in a manner intimately to intermix said reactants and form a fine mist thereof in said reaction chamber;

(c) controlling the temperatures and rates of entry of said entering reactants whereby the reaction takes place to form a free flowing powder reaction product prior to impinging on a reaction chamber wall and sufficiently far from the reactant entry that plugging at the entry region due to reaction product build-up is positively avoided.

3. A process as defined in claim 2 wherein said gaseous silicon tetrafluoride is directed into the substantially cold liquid sodium at a temperature of between about 200° C. and about 600° C. thereby heating said substantially cold liquid sodium to at least 150° C.

4. A process as defined in claim 2 wherein a heating and dispersing hot inert gas at a temperature of between about 300° C. to about 600° C. is directed into said reaction chamber substantially concentrically and intimately around said substantially cold liquid sodium thereby to atomize the substantially cold sodium and heat said substantially cold liquid sodium to at least 150° C.; said silicon tetrafluoride is directed into said substantially cold liquid sodium and inert gas substantially concentrically from all sides and at substantially ambient temperature.

5. A process as defined in claim 2 wherein said silicon tetrafluoride is mixed with a temperature controlling inert gas prior to delivery into said reactor thereby to form a gas mixture being directed into said substantially cold liquid sodium substantially concentrically from all sides thereby heating said substantially cold liquid sodium to at least 150° C.

6. A process of claim 5 wherein said gas mixture comprises about 10% cold silicon tetrafluoride and about 90% hot argon; wherein the delivery temperature of said cold silicon tetrafluoride being approximately ambient and said argon being at a temperature of between about 300° C. to about 600° C.; and said gas mixture being at a temperature sufficient to heat said substantially cold liquid sodium to at least 150° C.

7. A process of claim 2 wherein said liquid sodium is sprayed into said silicon tetrafluoride at a temperature between about 200° C. to about 600° C.

8. A process of claim 2 wherein the temperatures and rates of entry of said entering reactants are such that the reduction reaction takes place a distance greater than about 1 cm from the reactant entry region for said substantially cold liquid sodium.

* * * * *